A. J. DAVIS.
METHOD OF PRESERVING MILK AND MILK PRODUCTS.
APPLICATION FILED DEC. 18, 1911.
1,157,976.
Patented Oct. 26, 1915.
2 SHEETS—SHEET 1.
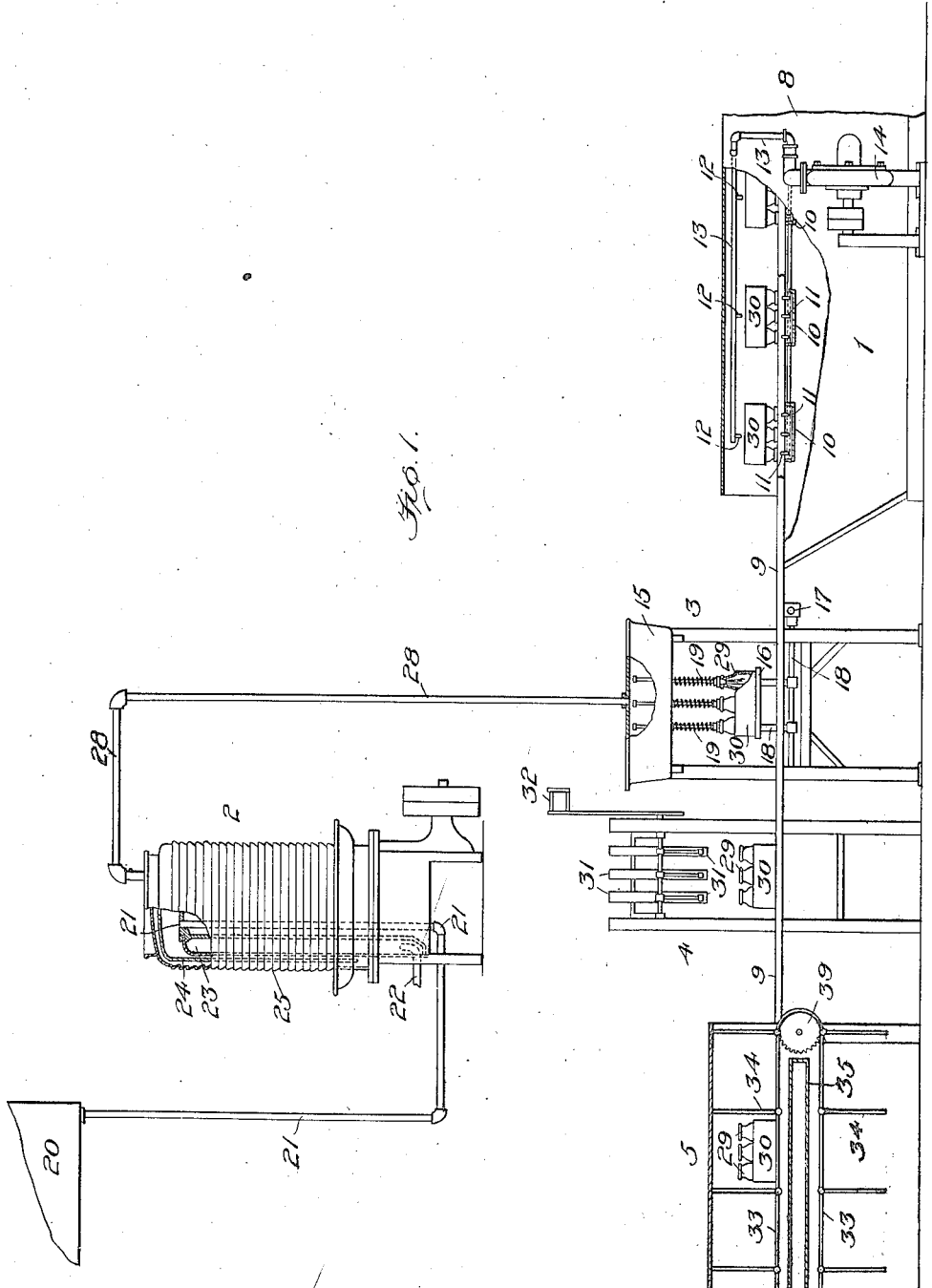

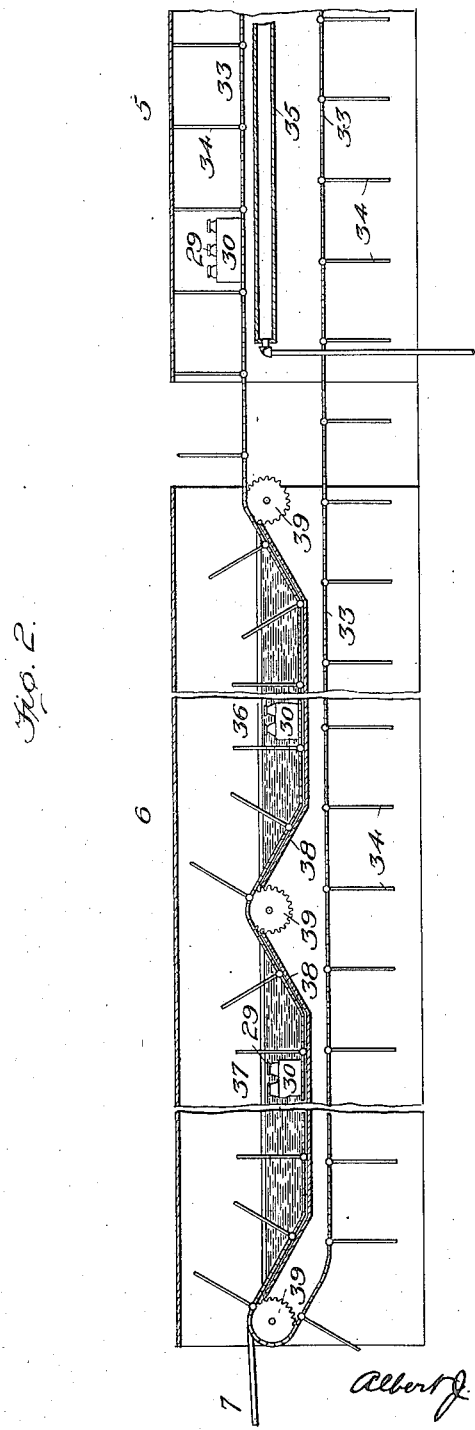

UNITED STATES PATENT OFFICE.

ALBERT J. DAVIS, OF NEW YORK, N. Y.

METHOD OF PRESERVING MILK AND MILK PRODUCTS.

1,157,976.   Specification of Letters Patent.   Patented Oct. 26, 1915.

Application filed December 18, 1911. Serial No. 666,535.

*To all whom it may concern:*

Be it known that I, ALBERT J. DAVIS, a citizen of the United States, and a resident of the city, county, and State of New York, have invented a Method of Preserving Milk and Milk Products, of which the following is a specification.

The principal objects of my invention are to preserve milk and milk products for as long a time as possible, and without materially changing their character except by the removal of the injurious bacteria from the products.

Another object of my invention is to remove all bacteria and other elements that are injurious to health from the milk or milk products, and to prevent the admission of said elements to the products for as long a time as possible, but without materially changing their character.

My invention consists in subjecting the milk or milk products to a pasteurizing temperature of from about one hundred and thirty five to one hundred and sixty five degrees Fahrenheit (135° to 165° F.), introducing said products at said pasteurizing temperature into clean and preferably hot bottles, jars, or other receptacles, the temperature of said receptacles at such time when hot being about or near that of said pasteurizing, then closing the receptacles while they and the inclosed products are at said temperatures. After this the closed receptacles containing the pasteurized products, may be held at said temperature for any desired time in order to insure complete pasteurization, and then allowed to cool at the ordinary temperature, or cooled in any convenient manner, as desired.

The accompanying drawing is a diagrammatic illustration of apparatus such as could be used for carrying out my invention in the treatment of milk or milk products.

Figure 1 represents a bottle washing apparatus, a milk pasteurizer, a bottle filling and stoppering machine, and one end of a device for holding the bottled milk or milk products at an even temperature, and Fig. 2 represents the other end of said device and a cooling apparatus.

The following characters represent like parts in both figures: 1 is an ordinary milk bottle washing apparatus, 2 is a milk pasteurizer, 3 is a milk bottle filling machine, 4 is a bottle stoppering machine, 5 is an apparatus for keeping milk or similar products at an even temperature, 6 is a cooling apparatus, and 7 is a table beyond said apparatus.

All of the above devices are preferably used in my improved method of preserving milk and similar milk products, and all of said devices except the pasteurizer being arranged in continuous order from the bottle washing apparatus to the final cooling apparatus and delivery table.

The bottle washing apparatus is provided with a receptacle 8 which is nearly closed, leaving room, however, for the admission to and outlet from the same of boxes or cases containing milk bottles. Extending longitudinally within and beyond said receptacle 8 is a horizontal support 9 preferably in the form of rails for supporting the boxes containing the milk bottles and guiding them thereon. This support or table 9 continues beyond the washing apparatus 1 through the bottle filling and stoppering machines and to the apparatus for keeping the even temperature, 5. Supported under the rails of the support 9 are shallow jackets 10, into which are led small outlet pipes 11. Other outlet pipes 12 are situated within the casing 8 above the support 9, and both pipes 11 and 12 are connected with supply pipes 13 from a source of hot water or other liquid supply under pressure, as, for example, from a pump 14.

15 is a receiving tank for the pasteurized milk which enters said tank from the pasteurizer hereinafter to be described.

16 is a vertically movable platform, which is adapted to be raised and lowered at will by means of bell crank lever 17, 18, the handle being shown at 17.

19 represents the ordinary spring valves that are connected with the tank 15 for the purpose of filling the milk bottles, when they are raised by the platform 16 so that the necks of said bottles will press upon the lower ends of said valves and open the same.

20 is a tank for holding the supply of milk to be treated. Extending downward from said tank is an inlet pipe 21 for the passage of the milk from the tank 20 into the pasteurizer 2.

22 is a steam inlet pipe for the introduction of steam into a steam jacket 23 surrounding the inlet pipe 21. Surrounding the outer wall of said jacket 23 is a casing 24 there being a space between said casing and wall and a passageway at the bottom of said casing from said space outward. Outside of the casing 24 is the exterior casing 25 which is preferably corrugated; there also being a space between said two casings 24 and 25. The top of casing 24 is closed, as is also the top of the casing 25 except for the introduction of the outlet pipe 28. Both ends of the steam jacket 23 are closed, and said upper ends are also connected by a closed dome or ceiling, except for the passage therethrough of the outlet end of the pipe 21. The outlet pipe 28, as above stated passes through the closed top of the outer casing 25 and extends down into the tank 15 of the bottle filling machine 3.

29 represents milk bottles inclosed in an ordinary box or casing 30.

31 represents the vertical tubes for containing the ordinary paper or similar disk stoppers for the milk bottles, and 32 is the handle lever for forcing the same down to the bottles and inserting the disks or other stoppers.

33 is an endless carrier provided with wings or partitions 34 extending outward from the same, and for the purpose of dividing the device 5 into compartments, since said wings 34 extend to, or almost to, the top of said device 5.

35 is a jacket for hot water or steam for the purpose of keeping the device 5 and whatever is in said device of practically the same temperature as said jacket.

The cooling apparatus 6 is supplied with tanks 36, 37 for water or other liquid, said tanks being divided by a partition 38. There may be as many of these tanks as desired, but the last tank should be for cold liquid, preferably iced. The preceding tank or tanks may be of warmer water, those of each succeeding tank being for liquid colder than the preceding one. The carrier 34 is adapted to pass not only through the device 5 but through the cooling apparatus 6, and the tank or tanks of said apparatus. For this purpose I have shown the partition 38 in the form of a double incline and with the carrier 33, 34 passing through said tanks and over said incline, to the delivery table 7. There is also a decline for the carrier 33, 34 from the device 5 into the first tank 36 of the cooler 6, and there is an incline from the last tank 37 to delivery table 7. The carrier 33, 34 can be operated in any manner, as, for example, by providing it with sprocket chains passing over ordinary sprocket wheels 39.

My improved method when used with the above described apparatus is as follows: The boxes or empty bottles 29, 30 are first inserted in the receptacle 8 of the washing apparatus 1 on the rails of the support 9, over the jackets 10. The hot water is caused by the pump 14 to be forced through the pipes 11 and 12 so that the interior of the bottles and the boxes and the exterior of the same shall be completely washed and preferably heated, the hot water or steam that is injected through the pipes 11 and 12 thoroughly cleansing and heating the bottles. While this is taking place, the milk from the tank 20 passes down to pipe 21 into the pasteurizer, which heats the milk to a temperature about 135° to 165° F., preferably somewhat over 135°, to prevent too much cooling of the milk before it enters the bottles. The milk in the pasteurizer 2 is heated by the surrounding steam jacket 23, the milk passing up through the pipe 21, into the dome above the steam jacket and outside of said jacket, and then around the inner casing 24 and out of the pipe 28 into the tank 15. The boxes of bottles 29, 30 are then drawn out of the washing apparatus 1, and turned right side up upon the platform 16 of the filler 3. Said platform is then raised by the lever 17, 18 so that the outlet ends of the valves 19 enter the mouths of said bottles, and the pasteurized milk from the tank 15 enters the bottles 29. The temperature of the bottle washing machine 1 in order to produce the best results should keep the bottles up to as near as possible the temperature of the pasteurized milk that is to enter said bottles. After the bottles have been filled, the platform 16 is lowered, and the boxes of bottles 29, 30 are drawn along the rails of the platform 9 under the tubes 31 of the stoppering machine, when the disk stoppers are inserted in the necks of the bottles in the usual manner by means of the handle 32 forcing the disks or stoppers into the bottle necks. Up to this point the milk at a pasteurizing temperature has been introduced into the clean bottles when they were at practically the same temperature, and sealed. If desired, the filled bottles will then be allowed to cool naturally, or in any desired manner. The best results for insuring complete pasteurization, however, are attained by retaining the filled bottles at the pasteurizing temperature for some little time, and this can be done by passing the filled bottles 29 in the boxes 30 onto the carrier 33 between two adjacent wings 34, and then drawing the same through the device 5 over the heating jacket 35. The carrier can be operated at will as fast or as slowly as desired, or it may remain quiet for a while with the filled bottles inside the receptacle 5. In the apparatus above described and illustrated in the drawings, after the filled bottles in the boxes have been passed by the carrier out of the device 5, they are carried down into the tank of cooling liquid 36, and then pass into a tank of a still colder liquid 37 and then from said tank out upon the delivery table 7, when the bottles containing the milk are ready for sale or shipment. As above stated, the last tank 37 should be very cold and for containing iced water or some other rapidly cooling medium.

I am aware that it is old to preserve milk by sterilizing it, but this treatment entirely changes the character of the milk, in fact, it boils it. The main object to be attained in preserving milk is to still retain its original character. I have found that cold bottles or receptacles accumulate a large amount of injurious bacteria, which soon causes everything that is placed therein to spoil and renders it unfit for use. The cleaning of the bottles at a temperature of 135° to 165° F., and retaining them at this temperature while the milk at practically the same temperature is inserted therein, and then the sealing of the bottles will accomplish the purpose of preventing the admission and growth of injurious bacteria in the bottles and in the milk. When the bottles treated in the manner above described are kept at a temperature of the pasteurized milk at say from 135° to 165°, for a short time and then afterward cooled, the milk may be kept pure and fresh for a considerable length of time without any extra refrigeration or additional cooling.

I do not limit myself to the precise method above set forth, nor to the apparatus above described and shown in the drawings, as it will be evident that many changes may be made therein without departing from the spirit of my invention, or sacrificing its principal advantages.

What I claim as new and desire to secure by Letters Patent is:

1. The improved method of preserving milk and similar products consisting in pasteurizing the same, then while at its pasteurizing temperature and without intermediate treatment, introducing it into a clean heated receptacle and closing said receptacle while hot, and with the product at the pasteurizing temperature.

2. The improved method of preserving milk and similar products consisting in pasteurizing the same, then while at its pasteurizing temperature and without intermediate treatment, introducing it into a clean receptacle heated to pasteurizing temperature and closing said receptacle while hot.

3. The improved method of preserving milk and similar products consisting in pasteurizing the same, then while at its pasteurizing temperature and without intermediate treatment, introducing it into a clean heated receptacle, closing said receptacle while hot, and with the product at the pasteurizing temperature, and rapidly cooling the receptacle and inclosed product.

4. The improved method of preserving milk and similar products consisting in pasteurizing the same, then while at its pasteurizing temperature and without intermediate treatment, introducing it into a clean receptacle heated to pasteurizing temperature, then closing said receptacle, and cooling the receptacle and inclosed product.

5. The improved method of preserving milk and similar products consisting in pasteurizing the same, then while at its pasteurizing temperature and without intermediate treatment, introducing it into a clean receptacle heated to pasteurizing temperature, then closing said receptacle, then retaining the receptacle and inclosed product at substantially the same temperature for an appreciable time and then cooling the same.

6. The improved method of preserving milk and similar products consisting in pasteurizing the same, then while at its pasteurizing temperature and without intermediate treatment introducing it into a clean heated receptacle, closing said receptacle while hot, and with the product at the pasteurizing temperature and retaining for an appreciable time the receptacle and inclosed product at substantially the same temperature, and then cooling the same, for the purpose set forth.

In testimony whereof, I have signed my name to this specification, in the presence of two subscribing witnesses.

ALBERT J. DAVIS.

Witnesses:
 EDWIN SEGER,
 ADAM SCHMIDT.